United States Patent [19]
McQueeny

[11] Patent Number: 5,813,525
[45] Date of Patent: Sep. 29, 1998

[54] COMPACT DISC HOLDER

[75] Inventor: Thomas Patrick McQueeny, Chicago, Ill.

[73] Assignee: R.R. Donnelley & Sons Company, Lisle, Ill.

[21] Appl. No.: 889,649

[22] Filed: Jul. 8, 1997

[51] Int. Cl.$^6$ .................................................. B65D 85/57
[52] U.S. Cl. ...................... 206/308.1; 206/310; 206/311
[58] Field of Search ................................. 206/308.1, 309, 206/310, 311, 303

[56] References Cited

U.S. PATENT DOCUMENTS

| | | |
|---|---|---|
| 4,535,888 | 8/1985 | Nusselder . |
| 4,676,374 | 6/1987 | Wilkins ..................................... 206/311 |
| 5,188,228 | 2/1993 | Barrett . |
| 5,246,107 | 9/1993 | Long et al. . |
| 5,284,248 | 2/1994 | Dunker ................................. 206/308.1 |
| 5,290,118 | 3/1994 | Ozeki . |
| 5,295,577 | 3/1994 | Minter . |
| 5,494,156 | 2/1996 | Nies . |
| 5,501,540 | 3/1996 | Ho . |
| 5,529,182 | 6/1996 | Anderson et al. . |
| 5,533,614 | 7/1996 | Walker . |
| 5,593,031 | 1/1997 | Uchida . |
| 5,593,032 | 1/1997 | Staley . |
| 5,595,797 | 1/1997 | Miller . |
| 5,595,798 | 1/1997 | Miller . |
| 5,638,952 | 6/1997 | Kim ....................................... 206/308.1 |

*Primary Examiner*—Jimmy G. Foster
*Attorney, Agent, or Firm*—Marshall, O'Toole, Gerstein, Murray & Borun

[57] ABSTRACT

In order to releasably retain compact discs in an orderly fashion, a compact disc holder includes a single thickness panel having a first surface and a second surface opposite the first surface. The first surface has a first retention assembly for releasably retaining a compact disc and the second surface has a second retention assembly for releasably retaining a compact disc. With this arrangement, the retention assemblies are disposed on the respective surfaces of the single thickness panel to support compact discs in generally superposed relation.

27 Claims, 2 Drawing Sheets

COMPACT DISC HOLDER

FIELD OF THE INVENTION

The present invention is generally directed to a compact disc holder and, more particularly, a compact disc holder having first and second disc supporting surfaces.

BACKGROUND OF THE INVENTION

In recent years, it is well recognized that compact discs have come into wide spread use for a variety of different purposes. They are typically of a standard diameter and thickness and are used to a significant extent for computer programs and data, and for use with so-called "multi-media" equipment. In these applications, compact discs are being used to an ever expanding degree due to the amount of program and data information that can be stored thereon.

Of course, compact discs are recognized as having many other uses that are equally well known. Perhaps the best known use is as a medium for recording and replaying music, although compact discs are also widely used for digitally recording visible subject matter such as photographs and the like. For all such uses, there is a need to be able to store compact discs in a manner that will protect them from damage.

In connection with the problem of storage, it is not uncommon for compact discs to be acquired by a consumer on a one-at-a-time or few-at-a-time basis. It is also the case that, as compact discs are increasingly coming into use for such a wide variety of different applications, there is a need to be able to effectively store compact discs in a highly organized and protected manner, particularly since compact discs tend to be expensive and oftentimes are quite difficult to replace. For these reasons, there has been a significant need for an organized, expansible, inexpensive system for facilitating the storage and retrieval of compact discs.

In recent years, and cognizant of the growing need, there have been a vast number of different proposals for storing compact discs. Unfortunately, they all have numerous drawbacks inasmuch as they are typically either complicated and expensive to manufacture, or they do not adequately function to store compact discs in a protected but organized fashion. As a result, it is recognized that there has remained a significant need for a compact disc holder that is entirely satisfactory in every respect.

The present invention is directed to overcoming one or more of the foregoing problems and achieving one or more of the resulting objects.

SUMMARY OF THE INVENTION

It is a principal object of the present invention to provide a compact disc holder that can be inexpensively manufactured. It is a further object of the present invention to provide a compact disc holder that has first and second opposed disc-supporting surfaces. It is an additional object of the present invention to provide a compact disc holder that supports compact discs in superposed relation.

Accordingly, the present invention is directed to a compact disc holder comprising a single thickness panel having a first surface and a second surface opposite the first surface. The first surface has first retention means for releasably retaining a compact disc and the second surface has second retention means for releasably retaining a compact disc. With this arrangement, the compact disc holder contemplates the retention means being disposed on the first and second surfaces to support compact discs in superposed relation.

In the exemplary embodiment, the single thickness panel is formed of thermoformed plastic having a single thickness sufficient to be flexible but self-supporting. It is also advantageous for the first and second retention means to each comprise positive projections on the first and second surfaces, respectively, which are preferably offset one from the other. In addition, the first and second retention means advantageously support compact discs on a common axis transverse to the first and second surfaces.

In the preferred embodiment, the first and second retention means each comprise a pair of circumferentially spaced retaining segments on the respective ones of the first and second surfaces that releasably retain compact discs in first and second planes that are generally parallel. The retaining segments on the respective ones of the first and second surfaces together advantageously comprise alternating positive projections and negative recesses defining superposed circular disc retention areas on each of the first and second surfaces. Also, the retaining segments on the respective ones of the first and second surfaces are advantageously positioned so as to be diametrically opposed with each of the retaining segments being formed so as to extend about the corresponding one of the circular disc retention areas by approximately 90°. Still additionally, the retaining segments on the respective ones of the first and second surfaces each preferably include a disc retaining lip which is spaced from but ramped downwardly and inwardly toward the corresponding one of the first and second surfaces.

As for the last-mentioned feature, the disc retaining lips on the respective ones of the first and second surfaces are preferably positioned so as to be diametrically opposed with each of the disc retaining lips being formed so as to extend about the corresponding one of the retaining segments by less than 90°.

As for other features, the compact disc holder preferably includes a peripheral disc supporting segment on the first and second surfaces radially adjacent each of the retaining segments which together comprise alternating positive projections and negative recesses thereby further defining the superposed circular disc retention areas. The supporting segments on the respective ones of the first and second surfaces are advantageously diametrically opposed one from the other with each of the supporting segments extending about the corresponding one of the retaining segments through an arc of approximately 90°. The compact disc holder also preferably includes a segmented disc hub support radially inwardly of each of the retaining segments on each of the first and second surfaces which together comprise alternating positive projections and negative recesses centrally disposed in each of the circular disc retention areas. With this arrangement, the disc hub supports on the respective ones of the first and second surfaces are advantageously diametrically opposed one from the other with each of the disc hub supports extending about the corresponding one of the circular disc retention areas by approximately 90°.

In a most highly preferred embodiment, the compact disc holder is suitable for use with a binder and includes a thermoformed leaf having a marginal edge for cooperation with the binder and a positively projecting hinging rib on at least one of the first and second surfaces generally adjacent the marginal edge. It is also advantageous for the marginal edge to have a plurality of holes for cooperation with the binder. Still additionally, the compact disc holder advantageously has a slot in an outermost surface of each of the retaining segments which extends generally tangential to the corresponding one of the circular disc retention areas so as to be diametrically opposed to releasably receive diagonally opposite corners of a booklet.

Other objects, advantages and features of the present invention will become apparent from a consideration of the following specification taken in conjunction with the accompanying drawings.

DETAILED DESCRIPTION OF THE PREFERRED EMBODIMENT

Figures 1, 2:
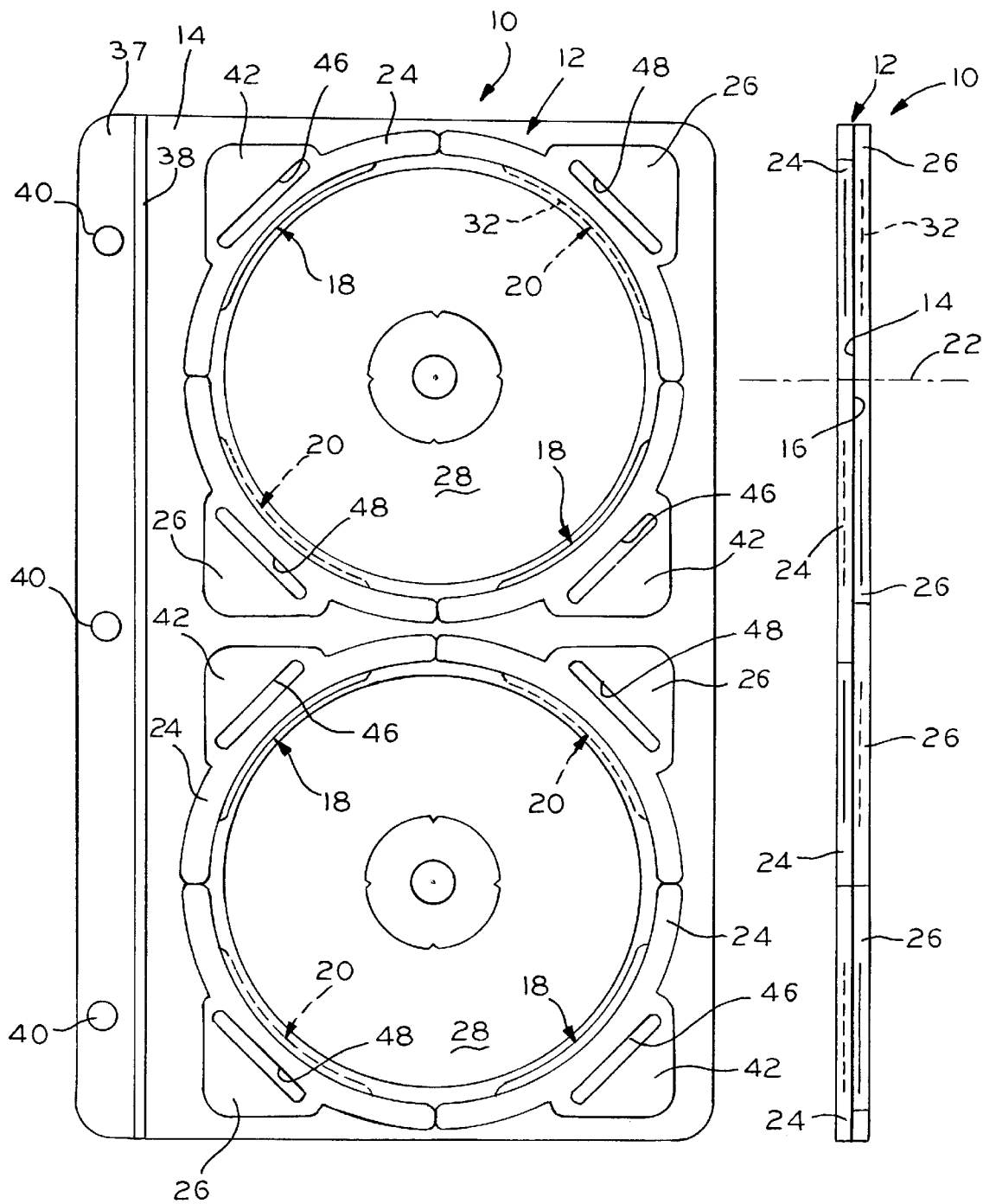
FIG. 1 is a plan view of a compact disc holder in accordance with the present invention.
FIG. 2 is a side elevational view of the compact disc holder of FIG. 1.

In the illustrations given, and with reference first to FIGS. 1 and 2, the reference numeral 10 designates generally a compact disc holder in accordance with the present invention which comprises a single thickness panel 12 having a first surface 14 and a second surface 16 opposite the first surface 14. The first surface 14 has first retention means generally designated 18 for releasably retaining a compact disc and the second surface 16 has second retention means generally designated 20 for releasably retaining a compact disc (see, also, FIGS. 3 and 4). The first and second retention means 18 and 20 are disposed on the respective surfaces 12 and 14 so as to support compact discs in superposed relation. The compact disc holder 10 is such that the single thickness panel 12 may suitably be formed of a material such as thermoformed plastic having a single thickness so as to be flexible while at the same time self-supporting (see, also, FIG. 4). As will be appreciated from FIG. 2, the compact disc holder 10 preferably is arranged such that the first and second retention means 18 and 20 support compact discs on a common axis 22 which extends transverse to the first and second surfaces 14 and 16.

Referring to FIG. 1–4, the first and second retention means 18 and 20 each will be understood to comprise positive projections 24 and 26 on the respective ones of the first and second surfaces 14 and 16 of the single thickness panel 12. The first and second retention means 18 and 20 can also be seen to be circumferentially offset in alternating relation, one from the other, on the respective ones of the first and second surfaces 14 and 16 by considering their relative positions as perhaps best shown in FIG. 1. As will now be clear from the illustrations and description, the first and second retention means 18 and 20 each comprise a pair of circumferentially spaced retaining segments 24 and 26 on the respective ones of the first and second surfaces 14 and 16.

Still referring to FIG. 1, the retaining segments 24 and 26 on the respective ones of the first and second surfaces 14 and 16 together comprise alternating positive projections and negative recesses defining superposed circular disc retention areas 28 and 30 on each of the first and second surfaces 14 and 16. In other words, the retaining segments 24 on the first surface 14 comprise positive projections relative to that surface and negative recesses relative to the second surface 16 whereas the retaining segments 26 on the second surface 16 comprise positive projections relative to that surface and negative recesses relative to the first surface 14. Moreover, as will be appreciated from FIG. 1, the retaining segments 24 and 26 on the respective ones of the first and second surfaces 14 and 16 are diametrically opposed with each of the retaining segments 24 and 26 extending about the corresponding one of the circular disc retention areas 28 and 30 by approximately 90°.

Figure 3:
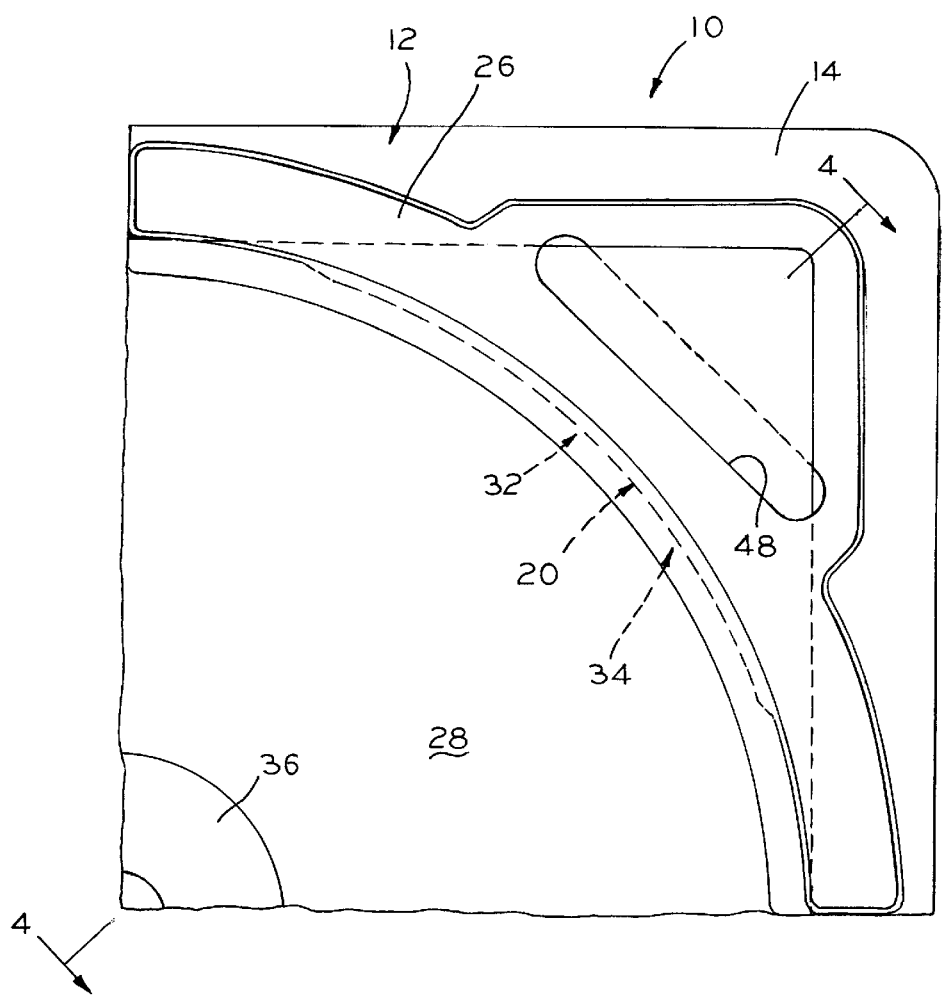
FIG. 3 is a plan view of one quadrant of a compact disc retention means shown supporting a booklet.
Figure 4:
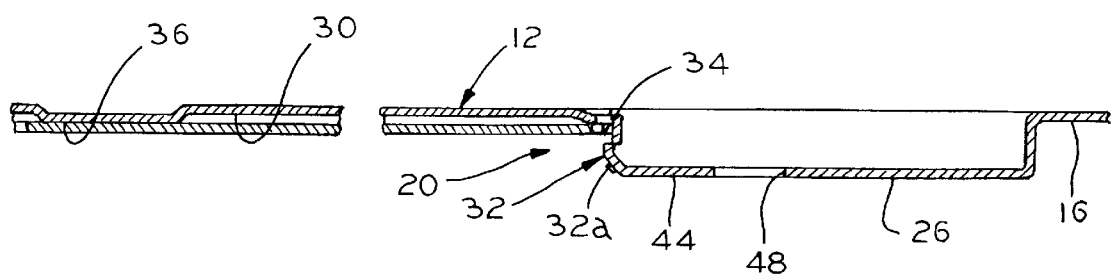
FIG. 4 is a cross-sectional view taken generally along the line 4—4 of FIG. 3 shown supporting a compact disc.

As best shown in FIG. 4, the retaining segments such as 26 on the respective ones of the first and second surfaces 14 and 16 each include a disc retaining lip such as 32 which is spaced from but ramped downwardly and inwardly toward the corresponding one of the first and second surfaces such as 16. The disc retaining lips such as 32 on the respective ones of the retaining segments 24 and 26 are diametrically opposed with each of the disc retaining lips such as 32 extending circumferentially about the corresponding one of the retaining segments such as 26 by an amount less than 90° (see, also, FIG. 3). By reason of the ramped surfaces such as 32a which extend downwardly and inwardly toward the corresponding surface such as 16, the diametrically opposed nature of the disc retaining lips such as 32 facilitate the insertion and removal of compact discs from the compact disc holder 10.

In this connection, and as previously mentioned, the single thickness panel 12 is preferably formed of a material such as thermoformed plastic so as to be flexible while at the same time self-supporting. This makes it possible for the compact disc to cause a slight separation as it is pressed inwardly toward the circular disc retention areas such as 30 by reason of the engagement of the peripheral edge of the compact disc with the corresponding ramped surfaces such as 32a. By reason of the flexible but self-supporting nature of the panel 12, the disc retaining lips such as 32 separate diametrically to permit passage of the compact disc to a position below the disc retaining lips such as 32.

As best shown in FIGS. 3 and 4, the compact disc holder 10 preferably includes a peripheral disc supporting segment such as 34 on the first and second surfaces 14 and 16 radially adjacent each of the retaining segments 24 and 26 which also together comprise alternating positive projections and negative recesses thereby further defining the superposed circular disc retention areas 28 and 30. The supporting segments such as 34 on the respective ones of the first and second surfaces 14 and 16 are diametrically opposed, one from the other, with each of the supporting segments such as 34 extending about the corresponding one of the retaining segments 24 and 26 through an arc of approximately 90°. Still referring to FIGS. 3 and 4, the compact disc holder 10 also includes a segmented disc hub support such as 36 radially inwardly of each of the retaining segments 24 and 26 on each of the first and second surfaces 14 and 16 which also together comprise alternating positive projections and negative recesses centrally disposed in each of the circular disc retention areas 28 and 30. The disc hub supports such as 36 on the respective ones of the first and second surfaces 14 and 16 are diametrically opposed one from the other with each of the disc hub supports such as 36 extending about the corresponding one of the circular disc retention areas 28 and 30 by approximately 90°.

As will be appreciated by referring to FIGS. 1 and 2, the first and second disc-supporting surfaces 14 and 16 are such as to define respective first and second generally parallel surface planes which necessarily cause the compact discs (see, also, FIG. 4) to be retained in respective first and second generally parallel disc planes. These planes are, of course, closely adjacent and parallel to the corresponding ones of the closely adjacent first and second generally parallel surface planes. As previously described, the positively-projecting retention means 24 and 26 of the first and second disc-supporting surfaces 14 and 16 are offset one from the other and, in particular, are circumferentially offset in alternating relation to grip compact discs so as to maintain them in generally parallel disc planes.

While not limited to any particular application, the compact disc holder 10 is well suited for use with a binder in which case the panel 12 may advantageously be formed as a thermoformed leaf. The thermoformed leaf 12 will be seen to have a marginal edge generally designated 37 for cooperation with a binder (not shown) and, for this purpose, the compact disc holder 10 may also include a hinging rib such as 38 on at least one of the first and second surfaces 14 and 16 generally adjacent the marginal edge 37. In addition, and as clearly shown in FIG. 1, the compact disc holder 10 may also include a plurality of holes such as 40 in the marginal edge 37 of the thermoformed leaf 12 for cooperation with a binder.

In the preferred embodiment, the first and second disc-supporting surfaces 14 and 16 each have positively-projecting retention means 24 and 26 for releasably retaining at least a pair of compact discs such that each of the pair of compact discs supported on the first surface 14 is in generally superposed relation with one of the pair of discs supported on the second surface 16. It will, thus, be appreciated that the compact disc holder 10 is well suited for supporting a total of four compact discs in such manner that each of the surfaces 14 and 16 is adapted to support two such discs. As will also be appreciated from FIGS. 1, 3 and 4, the retaining segments such as 24 and 26 each have an outermost surface such as 42 and 44 with a slot such as 46 and 48 extending generally tangential to the corresponding one of the circular disc retention areas such as 28 and 30 so that the slots 46 and 48 in the respective pairs of retaining segments 24 and 26 are diametrically opposed to releasably receive diagonally opposite corners of a booklet (see, especially, FIG. 3).

From the foregoing description, it will now be appreciated that the present invention makes it possible to utilize a single thickness of thermoformed plastic to provide functional storage for compact discs on both sides of a panel or leaf. This is accomplished using alternating positive projections and negative recesses which are so arranged as to permit nesting for shipment by reason of aligning the positive projections on one surface of one panel with the negative recesses of the opposite surface of an adjacent panel. Moreover, since it can be formed of thermoformed plastic, the compact disc holder can be inexpensively manufactured of recycled polystyrene with the thickness of the panel or leaf being selected such that there is a degree of flexibility while also providing self-supporting characteristics.

While not previously mentioned, the positive projections can have relatively large area flat surfaces to protect adjacent discs from one another. It is also contemplated that the thermoformed panel or leaf can have other embossments or ribs to provide additional rigidity if desired. Still further, booklets can be attached to the positive projections by a release adhesive rather than utilizing the tangential slots as an alternative.

With regard to the disc retaining lip and segmented disc hub support, they are provided to support the optical surface in slightly spaced relation to the remainder of the circular disc retention areas. They, too, comprise alternating positive projections and negative recesses as previously described. As a result of these features of construction, the disc retaining lips and segmented disc hub supports only contact the peripheral edge and central hub of the compact disc and not the optical surface.

As will finally be appreciated, the compact disc holder of the present invention is well suited for use with a binder wherein four compact discs can easily be supported on each thin panel or leaf in physically isolated relation to those on adjacent thin panels or leaves thereby maximizing storage capacity in a safe and highly economical manner.

While in the foregoing there has been set forth a preferred embodiment of the invention, it will be appreciated that the details herein given may be varied by those skilled in the art without departing from the true spirit and scope of the appended claims.

I claimed:

1. A compact disc holder, comprising:
   a single thickness panel having a first surface and a second surface opposite said first surface, said first surface having first retention means for releasably retaining a compact disc and said second surface having second retention means for releasably retaining a compact disc, said retention means being disposed on said surfaces to support compact discs in superposed relation.

2. The compact disc holder of claim 1 wherein said single thickness panel is formed of thermoformed plastic having a single thickness to be flexible but self-supporting.

3. The compact disc holder of claim 1 wherein said first and second retention means each comprise positive projections on said first and second surfaces, respectively.

4. The compact disc holder of claim 1 wherein said first and second retention means are laterally offset one from the other on said first and second surfaces, respectively.

5. The compact disc holder of claim 1 wherein said first and second retention means support compact discs on a common axis transverse to said first and second surfaces.

6. A compact disc holder, comprising:
   a panel having a first disc-supporting surface and a second disc-supporting surface opposite said first disc-supporting surface, said panel being formed of thermoformed plastic having a single thickness throughout so as to be flexible but self-supporting, said first disc-supporting surface having first positively-projecting retention means for releasably retaining a compact disc in a first plane and said second disc-supporting surface having second positively-projecting retention means for releasably retaining a compact disc in a second plane generally parallel to said first plane, said first and second positively-projecting retention means being positioned to support compact discs in generally superposed relation.

7. The compact disc holder of claim 6 wherein said first and second retention means support compact discs on a common axis transverse to said first and second surfaces.

8. The compact disc holder of claim 6 wherein said first and second retention means each comprise a pair of circumferentially spaced retaining segments on the respective ones of said first and second surfaces.

9. The compact disc holder of claim 8 wherein said retaining segments on the respective ones of said first and second surfaces together comprise alternating positive projections and negative recesses defining superposed circular disc retention areas on each of said first and second surfaces.

10. The compact disc holder of claim 9 wherein said retaining segments on the respective ones of said first and second surfaces are diametrically opposed with each of said retaining segments extending about the corresponding one of said circular disc retention areas by approximately 90°.

11. The compact disc holder of claim 9 wherein said retaining segments on the respective ones of said first and second surfaces each include a disc retaining lip which is spaced from but ramped downwardly and inwardly toward the corresponding one of said first and second surfaces.

12. The compact disc holder of claim 11 wherein said disc retaining lips on the respective ones of said retaining segments are diametrically opposed with each of the disc retaining lips extending about the corresponding one of said retaining segments by less than 90°.

13. The compact disc holder of claim 9 including a peripheral disc supporting segment on said first and second surfaces radially adjacent each of said retaining segments together comprising alternating positive projections and negative recesses thereby further defining said superposed circular disc retention areas.

14. The compact disc holder of claim 13 wherein said supporting segments on the respective ones of said first and second surfaces are diametrically opposed one from the other with each of said supporting segments extending about the corresponding one of said retaining segments through an arc of approximately 90°.

15. The compact disc holder of claim 9 including a segmented disc hub support radially inwardly of each of said retaining segments on each of said first and second surfaces together comprising alternating positive projections and negative recesses centrally disposed in each of said circular disc retention areas.

16. The compact disc holder of claim 15 wherein said disc hub supports on the respective ones of said first and second surfaces are diametrically opposed one from the other with each of said disc hub supports extending about the corresponding one of said circular disc retention areas by approximately 90°.

17. A compact disc holder, comprising:

a panel having first and second opposed disc-supporting surfaces in respective first and second generally parallel surface planes, said first and second disc-supporting surfaces each having positively-projecting retention means associated therewith for releasably retaining a compact disc in each of respective first and second generally parallel disc planes closely adjacent and parallel to corresponding ones of said first and second generally parallel surface planes, said positively-projecting retention means of said first and second disc-supporting surfaces being offset one from the other, said first and second retention means each comprising a pair of circumferentially spaced retaining segments on the respective ones of said first and second surfaces together comprising alternating positive projections and negative recesses thereby defining superposed circular disc retention areas on each of said first and second surfaces, said pairs of retaining segments on the respective ones of said first and second surfaces being diametrically opposed with each of said retaining segments extending about the corresponding one of said circular disc retention areas by approximately 90°, said retaining segments on the respective ones of said first and second surfaces each including a disc retaining lip spaced from but ramped downwardly and inwardly toward the corresponding one of said first and second surfaces, said disc retaining lips on the respective ones of said retaining segments being diametrically opposed with each of said disc retaining lips extending about the corresponding one of said retaining segments by less than 90°.

18. A compact disc holder comprising:

a panel having first and second opposed disc-supporting surfaces in respective first and second generally parallel surface planes, said first and second disc-supporting surfaces each having positively-projecting retention means associated therewith for releasably retaining a compact disc in each of respective first and second generally parallel disc planes closely adjacent and parallel to corresponding ones of said first and second generally parallel surface planes, said positively-projecting retention means of said first and second disc-supporting surfaces being offset one from the other, said first and second retention means each comprising a pair of circumferentially spaced retaining segments on the respective ones of said first and second surfaces together comprising alternating positive projections and negative recesses thereby defining superposed circular disc retention areas on each of said first and second surfaces, and including a peripheral disc supporting segment on said first and second surfaces radially adjacent each of said retaining segments together comprising alternating positive projections and negative recesses thereby further defining said superposed circular disc retention areas, said peripheral disc supporting segments on the respective ones of said first and second surfaces being diametrically opposed with each of said peripheral disc supporting segments extending about the corresponding one of said circular disc retention areas by approximately 90°.

19. A compact disc holder comprising:

a panel having first and second opposed disc-supporting surfaces in respective first and second generally parallel surface planes, said first and second disc-supporting surfaces each having positively-projecting retention means associated therewith for releasably retaining a compact disc in each of respective first and second generally parallel disc planes closely adjacent and parallel to corresponding ones of said first and second generally parallel surface planes, said positively-projecting retention means of said first and second disc-supporting surfaces being offset one from the other, said first and second retention means each comprising a pair of circumferentially spaced retaining segments on the respective ones of said first and second surfaces together comprising alternating positive projections and negative recesses thereby defining superposed circular disc retention areas on each of said first and second surfaces, and including a segmented disc hub support radially inwardly of each of said retaining segments on each of said first and second surfaces together comprising alternating positive projections and negative recesses centrally disposed in each of said circular disc retention areas, said segmented disc hub supports on the respective ones of said first and second surfaces being diametrically opposed with each of said segmented disc hub supports extending about the corresponding one of said circular disc retention areas by approximately 90°.

20. A compact disc holder comprising:

a panel having first and second opposed disc-supporting surfaces in respective first and second generally parallel surface planes, said first and second disc-supporting surfaces each having positively-projecting retention means associated therewith for releasably retaining a compact disc in each of respective first and second generally parallel disc planes closely adjacent and parallel to corresponding ones of said first and second generally parallel surface planes, said positively-projecting retention means of said first and second disc-supporting surfaces being offset one from the other, said panel being formed of thermoformed plastic of a single thickness throughout to be flexible but self-supporting and said retention means being disposed on said first and second surfaces so as to support discs in superposed relation.

21. A compact disc holder for a binder, comprising:
a thermoformed leaf having first and second opposed disc-supporting surfaces and a marginal edge for cooperation with a binder, said first and second disc-supporting surfaces each having positively-projecting retention means for releasably retaining a compact disc in respective first and second generally parallel planes and said positively-projecting retention means of said first and second disc-supporting surfaces being offset one from the other, said first and second positively-projecting retention means being positioned to support compact discs in generally superposed relation.

22. The compact disc holder of claim 21 wherein said first and second retention means each comprise a pair of circumferentially spaced retaining segments on the respective ones of said first and second surfaces together comprising alternating positive projections and negative recesses thereby defining superposed circular disc retention areas on each of said first and second surfaces, said pairs of retaining segments on the respective ones of said first and second surfaces being diametrically opposed with each of said retaining segments extending about the corresponding one of said circular disc retention areas by approximately 90°, said retaining segments on the respective ones of said first and second surfaces each including a disc retaining lip spaced from but ramped downwardly and inwardly toward the corresponding one of said first and second surfaces, said disc retaining lips on the respective ones of said retaining segments being diametrically opposed with each of said disc retaining lips extending about the corresponding one of said retaining segments by less than 90°.

23. The compact disc holder of claim 21 wherein said first and second retention means each comprise a pair of circumferentially spaced retaining segments on the respective ones of said first and second surfaces together comprising alternating positive projections and negative recesses thereby defining superposed circular disc retention areas on each of said first and second surfaces, and including a peripheral disc supporting segment on said first and second surfaces radially adjacent each of said retaining segments together comprising alternating positive projections and negative recesses thereby further defining said superposed circular disc retention areas, said peripheral disc supporting segments on the respective ones of said first and second surfaces being diametrically opposed with each of said peripheral disc supporting segments extending about the corresponding one of said circular disc retention areas by approximately 90°.

24. The compact disc holder of claim 21 wherein said first and second retention means each comprise a pair of circumferentially spaced retaining segments on the respective ones of said first and second surfaces together comprising alternating positive projections and negative recesses thereby defining superposed circular disc retention areas on each of said first and second surfaces, and including a segmented disc hub support radially inwardly of each of said retaining segments on each of said first and second surfaces together comprising alternating positive projections and negative recesses centrally disposed in each of said circular disc retention areas, said segmented disc hub supports on the respective ones of said first and second surfaces being diametrically opposed with each of said segmented disc hub supports extending about the corresponding one of said circular disc retention areas by approximately 90°.

25. The compact disc holder of claim 21 including a positively projecting hinging rib on at one of said first and second surfaces generally adjacent said marginal edge and including a plurality of holes in said marginal edge for cooperation with a binder.

26. The compact disc holder of claim 21 wherein said first and second disc-supporting surfaces each have positively-projecting retention means for releasably retaining at least a pair of compact discs such that each of said compact discs supported on said first surface is in generally superposed relation with one of said discs supported on said second surface.

27. The compact disc holder of claim 22 each of said retaining segments has an outermost surface with a slot extending generally tangential to the corresponding one of said circular disc retention areas such that said slots in said pair of retaining segments are diametrically opposed to releasably receive diagonally opposite corners of a booklet.

* * * * *